(12) United States Patent
Ihara et al.

(10) Patent No.: US 10,974,912 B2
(45) Date of Patent: Apr. 13, 2021

(54) METHOD AND DEVICE FOR TRANSFERRING COLUMNAR HONEYCOMB STRUCTURES

(71) Applicant: NGK INSULATORS, LTD., Nagoya (JP)

(72) Inventors: Chikashi Ihara, Nagoya (JP); Masato Shimada, Nagoya (JP); Shinya Yoshida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 23 days.

(21) Appl. No.: 16/176,266

(22) Filed: Oct. 31, 2018

(65) Prior Publication Data

US 2019/0177096 A1 Jun. 13, 2019

(30) Foreign Application Priority Data

Dec. 13, 2017 (JP) .............................. JP2017-239044

(51) Int. Cl.
*B65G 47/91* (2006.01)

(52) U.S. Cl.
CPC ...... *B65G 47/91* (2013.01); *B65G 2201/0235* (2013.01)

(58) Field of Classification Search
CPC .................. B65G 47/91; B65G 2201/0235
See application file for complete search history.

(56) References Cited

U.S. PATENT DOCUMENTS

| | | | | |
|---|---|---|---|---|
| 4,355,936 A * | 10/1982 | Thomas | ................. | B65B 23/08 414/796.2 |
| 4,787,812 A * | 11/1988 | Gopfert | ................. | B66C 1/0212 414/737 |
| 5,549,340 A * | 8/1996 | Nagai | ................... | B65G 47/91 294/189 |
| 5,813,713 A * | 9/1998 | Van Den Bergh | ..... | B65G 47/91 294/2 |
| 7,017,961 B1 * | 3/2006 | Parnell | ................. | B25J 15/0616 294/188 |
| 7,632,452 B2 * | 12/2009 | Saijo | ........................ | F27B 9/38 264/630 |
| 8,251,415 B2 * | 8/2012 | Lomerson, Jr. | ...... | B25J 15/0616 294/2 |

(Continued)

FOREIGN PATENT DOCUMENTS

| | | |
|---|---|---|
| DE | 42 34 568 A1 | 4/1994 |
| GB | 977209 A | 12/1964 |

(Continued)

OTHER PUBLICATIONS

German Office Action (with English translation), German Application No. 10 2018 008 710.8, dated Jul. 29, 2019 (10 pages).

*Primary Examiner* — Stephen A Vu
(74) *Attorney, Agent, or Firm* — Burr & Brown, PLLC

(57) ABSTRACT

A method for transferring a plurality of columnar honeycomb structures according to the present invention includes: subjecting first side surfaces of the plurality of columnar honeycomb structures to vacuum suction; and correctively transferring the plurality of the columnar honeycomb structures, optionally while supporting second side surfaces opposing to the first side surfaces of the plurality of columnar honeycomb structures by a supporting member.

9 Claims, 6 Drawing Sheets

(56) References Cited

U.S. PATENT DOCUMENTS

| | | | |
|---|---|---|---|
| 9,156,570 B2* | 10/2015 | Lomerson, Jr. | B25J 15/0052 |
| 2007/0280812 A1 | 12/2007 | Morency et al. | |
| 2015/0274447 A1* | 10/2015 | McCollum | B25J 15/10 |
| | | | 414/792.6 |
| 2018/0134501 A1* | 5/2018 | Ge | B65G 47/91 |

FOREIGN PATENT DOCUMENTS

| | | |
|---|---|---|
| JP | 3828722 B2 | 10/2006 |
| JP | 5054830 B2 | 10/2012 |
| WO | 2017/181337 A1 | 10/2017 |

* cited by examiner

[FIG. 1]
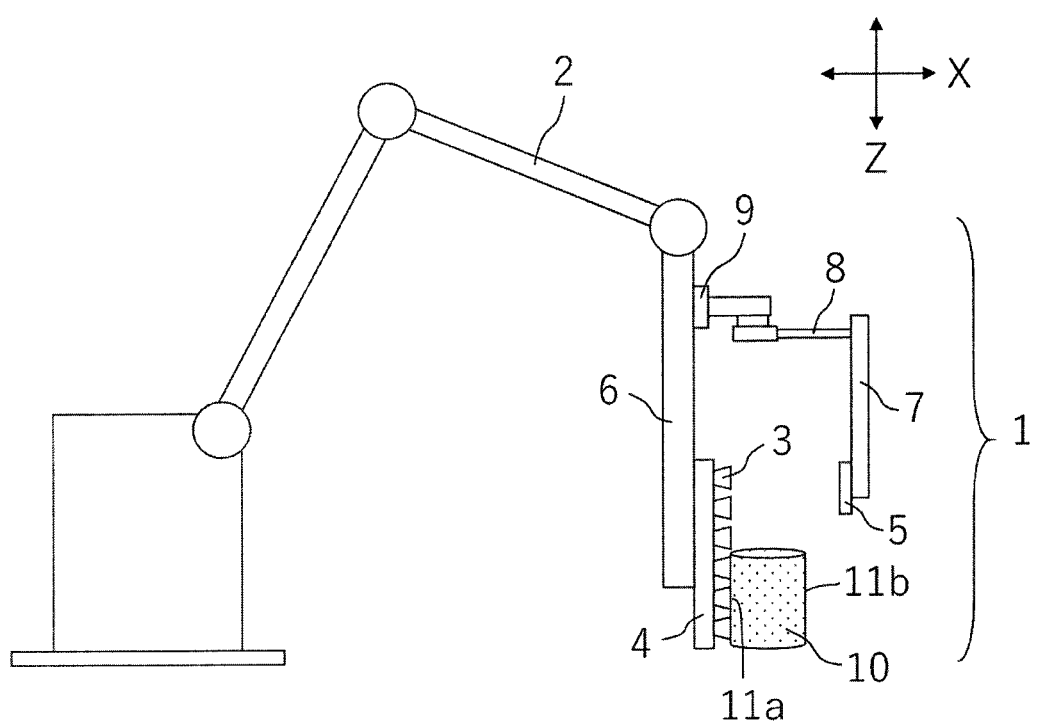

[FIG. 2]
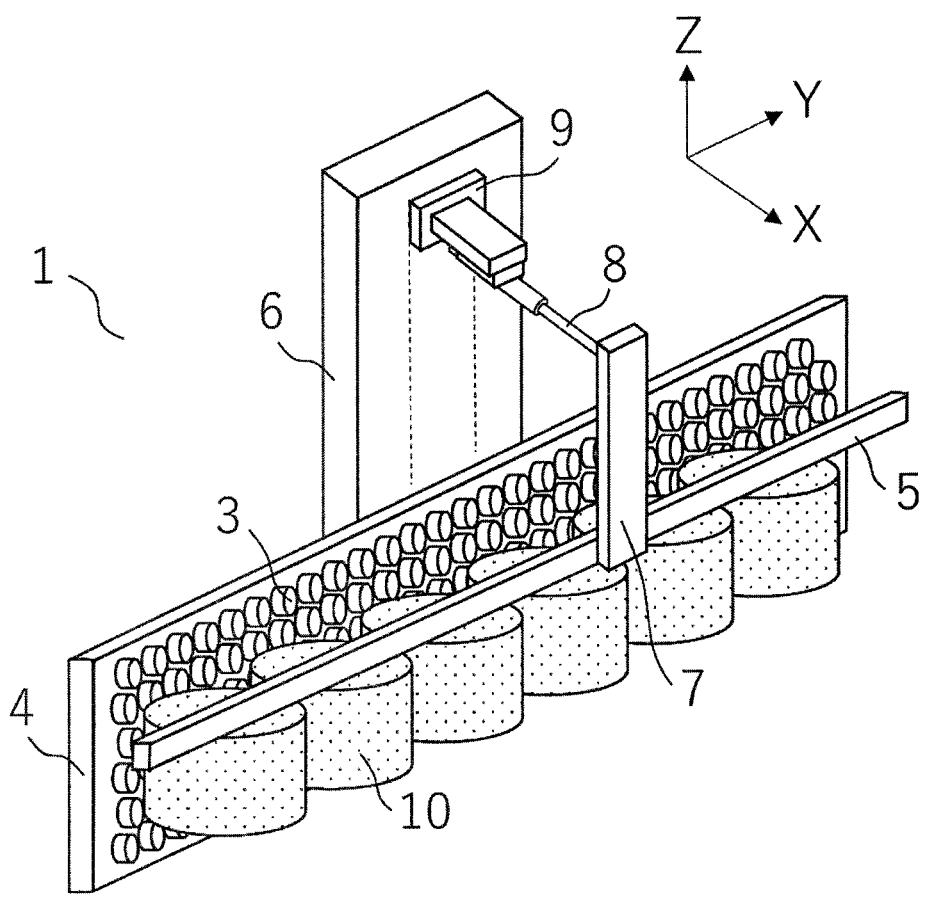

[FIG. 3]
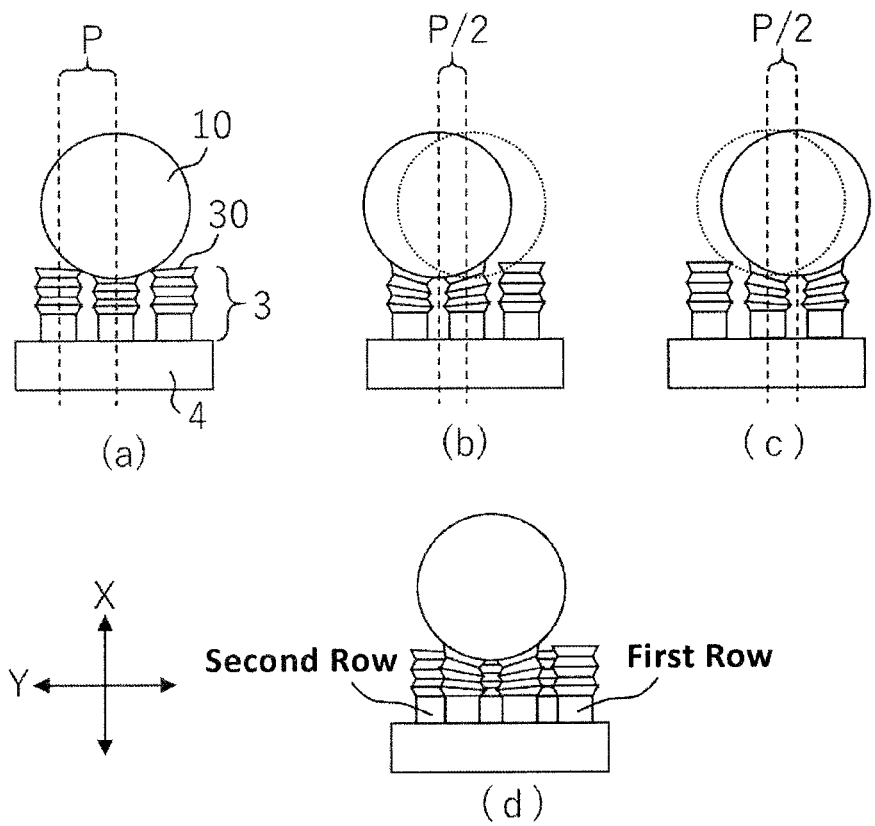

[FIG. 4]
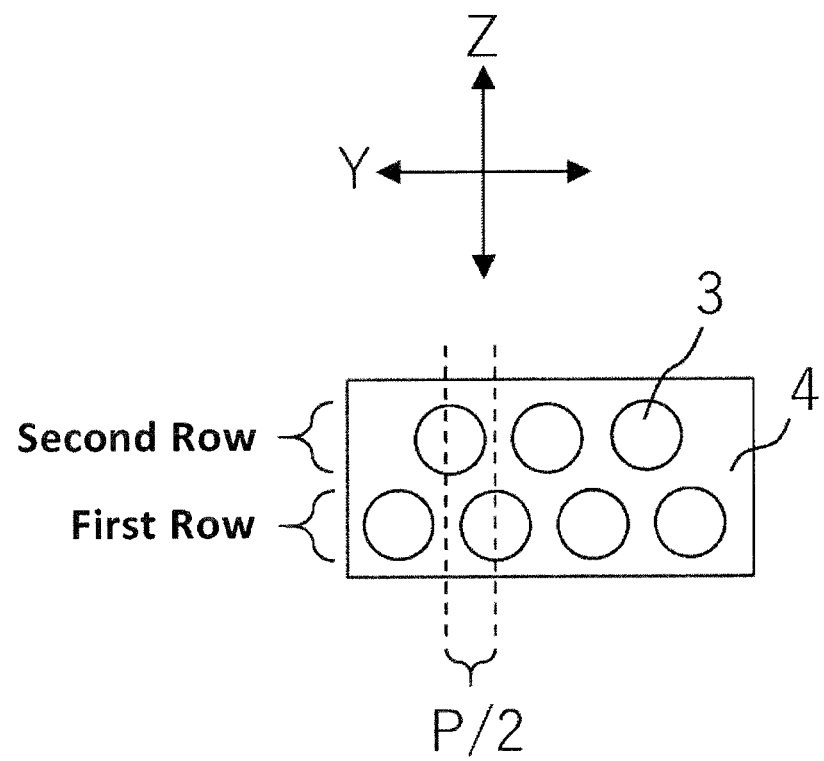

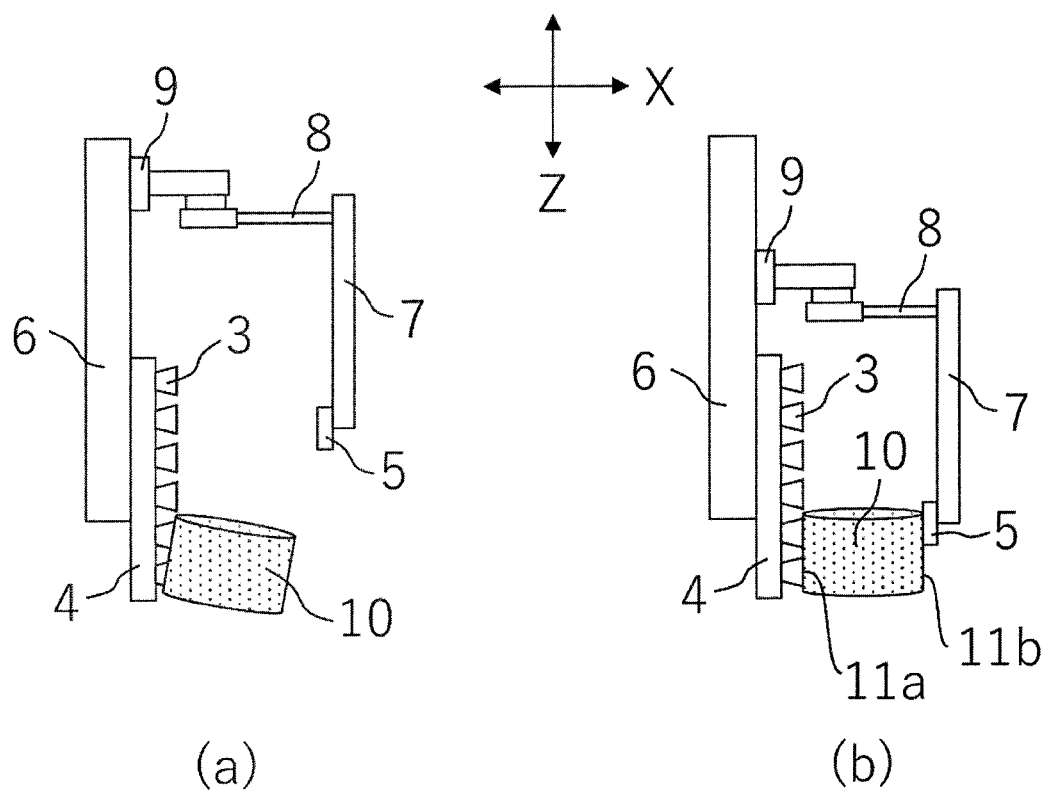
[FIG. 5]

[FIG. 6]
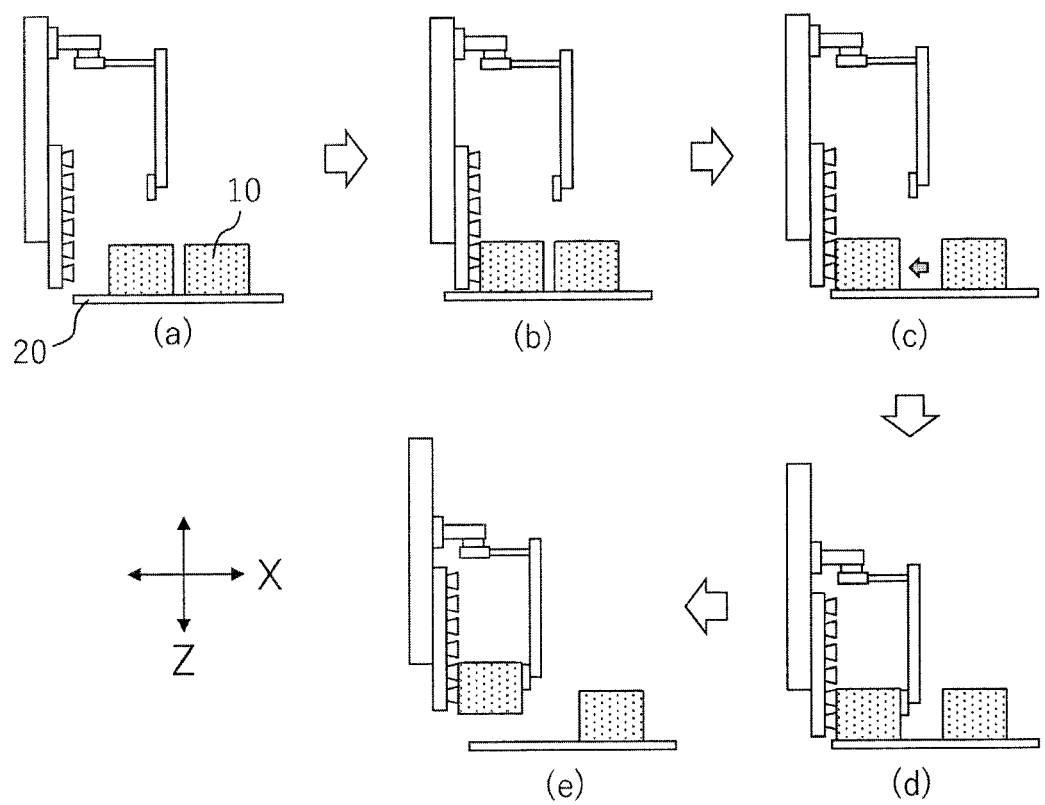

METHOD AND DEVICE FOR TRANSFERRING COLUMNAR HONEYCOMB STRUCTURES

TECHNICAL FIELD

The present invention relates to a method and a device for collectively transferring a plurality of columnar honeycomb structures.

BACKGROUND ART

A columnar honeycomb structure is used for various applications such as catalyst supports for use in catalyst bodies in internal combustion engines, boilers, chemical reaction devices, reformers for fuel cells, and the like; and collection filters for particulate substances (especially diesel fine particles) in an exhaust gas. The columnar honeycomb structure is generally produced by forming a green body containing ceramic powder into a desired shape, drying and firing the green body, and then processing the green body. Most of the steps are automated in terms of production efficiency or the like.

On the other hand, between the respective steps, the columnar honeycomb structure may be transferred onto a pallet or a conveyor, or pallets onto which the columnar honeycomb structures have been transferred and placed may be stacked and temporarily stored, for preparations for use in the next step. However, such a transferring operation of the columnar honeycomb structure between the respective steps currently relies on manual operation by an operator, which has been a cause of a decrease in production efficiency.

Further, some devices for transferring columnar honeycomb structure have been proposed (for example, Patent Documents 1 and 2). However, the conventional transfer devices can transfer only one columnar honeycomb structure at a time. Therefore, improvement of production efficiency has been limited.

CITATION LIST

Patent Literatures

Patent Document 1: Japanese Patent No. 3828722 B
Patent Document 2: Japanese Patent No. 5054830 B

SUMMARY OF INVENTION

Technical Problem

The present invention has been made to solve the above problems. An object of the present invention is to provide a transfer method and a transfer device for transferring a plurality of columnar honeycomb structures, which can collectively transfer the columnar honeycomb structures.

Solution to Problem

The present inventors have found that when first side surfaces of a plurality of columnar honeycomb structures are subjected to vacuum suction and the columnar honeycomb structures cannot be stably gripped only by the vacuum suction, second side surfaces opposing to the first side surfaces of the plurality of columnar honeycomb structures are supplementally supported by a support member, thereby enabling the above problems to be solved. The present inventors have completed the present invention on the basis of the findings.

Thus, the present invention relates to a method for transferring a plurality of columnar honeycomb structures, the method comprising: subjecting first side surfaces of the plurality of columnar honeycomb structures to vacuum suction; and correctively transferring the plurality of the columnar honeycomb structures, optionally while supporting second side surfaces opposing to the first side surfaces of the plurality of columnar honeycomb structures by a supporting member.

The present invention also relates to a device for transferring a plurality of columnar honeycomb structures, comprising:

a vacuum suction member comprising a plurality of vacuum suction pads, the vacuum suction member being configured to vacuum-sucking first side surfaces of the plurality of columnar honeycomb structures by the plurality of vacuum suction pads; and a support member that is drivable in two X and Z directions perpendicular to a Y direction in which the vacuum-sucked columnar honeycomb structures are aligned, the support member optionally supporting second side surfaces opposing to the first side surfaces of the plurality of columnar honeycomb structures.

Advantageous Effects of Invention

According to the present invention, it is possible to provide a method and a device for transferring a plurality of columnar honeycomb structures, which can collectively transferring the plurality of columnar honeycomb structures.

BRIEF DESCRIPTION OF DRAWINGS

FIG. 1 is a side view showing an example of a device for transferring columnar honeycomb structures according to the present invention.

FIG. 2 is an enlarged perspective view of the gripping mechanism in FIG. 1.

FIG. 3 is a partial enlarged view in an X-Y direction, showing that a columnar honeycomb structure has been vacuum-sucked onto vacuum suction pads.

FIG. 4 is a partial enlarged view in a Y-Z direction, showing an arrangement state of vacuum suction pads.

FIG. 5 is an enlarged side view of a gripping mechanism showing that a columnar honeycomb structure having a low height has been gripped, where FIG. 5(a) shows a case of using only vacuum suction, and FIG. 5(b) shows a case of using vacuum suction together with a support member.

FIG. 6 is an enlarged side view of a gripping mechanism for explaining a transferring procedure of a plurality of columnar honeycomb structures closely arranged in an X-Y direction on a pallet.

DESCRIPTION OF THE PREFERRED EMBODIMENTS

The method for transferring a plurality of columnar honeycomb structures according to the present invention includes subjecting first side surfaces of the plurality of columnar honeycomb structures to vacuum suction; and correctively transferring the plurality of the columnar honeycomb structures, optionally while supporting second side surfaces opposing to the first side surfaces of the plurality of columnar honeycomb structures by a supporting member.

Hereinafter, a transfer device suitable for carrying out the method for transferring the columnar honeycomb structures according to the present invention will be described with reference to the drawings, but the present invention should not be construed as being limited thereto, and various modifications and improvements may be made based on the knowledge of a person skilled in the art, without departing from the scope of the present invention.

FIG. 1 is a side view showing an example of the device for transferring the columnar honeycomb structures according to the present invention. As shown in FIG. 1, a transfer device for columnar honeycomb structures 10 includes: a gripping mechanism (a gripper) 1 for gripping a plurality of columnar honeycomb structures 10; and an arm 2 connected to the gripping mechanism 1 and for moving the plurality of columnar honeycomb structures 10 gripped by the gripping mechanism 1 to a predetermined position.

FIG. 2 is an enlarged perspective view of the gripping mechanism 1 in FIG. 1. The gripping mechanism 1 includes: a vacuum suction member 4 having a plurality of vacuum suction pads 3; and a support member 5. The vacuum suction member 4 and the support member 5 are attached to a vacuum suction member shaft 6 and a support member shaft 7, respectively. Between the vacuum suction member shaft 6 and the support member shaft 7 is a driver for moving the support member 5 in an X direction and a Z direction. The driver includes: an X direction driver 8 and a Z direction driver 9 which move the support member 5 in the X direction and the Z direction, respectively. The support member 5 is movable by the X direction driver 8 and the Z direction driver 9 in two directions (the X direction and the Z direction) perpendicular to a direction (Y direction) in which the vacuum-sucked columnar honeycomb structures 10 are aligned. It should be noted that the Z direction means a vertical direction, and the X direction means a direction perpendicular to the Y direction and the Z direction.

The vacuum suction member 4 is connected to a vacuum generator (not shown) such as a vacuum pump and a vacuum blower, and the suction surface of the vacuum suction member 4 is provided with vacuum suction pads 3.

A preferable shape of each vacuum suction pad 3 includes, but not limited to, a bellows shape. The bellows-shaped vacuum suction pads 3 can provide reduced impact on the columnar honeycomb structures 10 during vacuum suction, and also provide good vacuum suction by following the first side surfaces 11a of the columnar honeycomb structures 10 even if each first side surface 11a has a curved surface.

A preferable material of each vacuum suction pad 3 includes, but not limited to, elastic materials. Examples of the elastic materials includes, but not limited to, silicone rubbers, ethylene propylene diene rubbers (EPDMs), nitrile rubbers, natural rubbers, and the like. Among them, the silicone rubbers or EPDMs enable the opening of each vacuum suction pad 3 to be flexibly deformed, allowing good vacuum suction even if the first side surface 11a of each columnar honeycomb structure 10 has a curved surface. Further, in particular the EPDMs allows the columnar honeycomb structure 10 to be difficult to leave traces of the vacuum suction pad 3 after vacuum suction.

A method of arranging the vacuum suction pads 3 is not particularly limited, but a plurality of vacuum suction pads 3 may preferably be provided in the Y direction and the Z direction. Such a configuration enables the columnar honeycomb structures 10 to be gripped without providing a side supporter (a guide member) as described in Japanese Patent No. 3828722 B. Further, since the plurality of vacuum suction pads 3 are provided in the Y direction, the plurality of columnar honeycomb structures 10 arranged in the Y direction can be correctively vacuum-sucked. Furthermore, since the plurality of vacuum suction pads 3 are provided in the Z direction, the plurality of vacuum suction pads 3 can be vacuum-sucked onto one columnar honeycomb structure 10, so that the columnar honeycomb structure 10 can be stably gripped.

Referring to FIG. 3, it shows a partially enlarged view in the X-Y direction, in which the columnar honeycomb structure 10 has been vacuum-sucked onto the vacuum suction pads.

When the columnar honeycomb structure 10 is in the form of cylinder, an excessively large diameter of a suction portion 30 of each vacuum suction pad 3 will result in difficulty of vacuum suction of the first side surface 11a of each columnar honeycomb structure 10 to each vacuum suction pad 3. Therefore, the diameter of the suction portion 30 of each vacuum suction pad 3 is preferably equal to or less than a cylindrical radius of each columnar honeycomb structure 10. By controlling the diameter of the suction portion 30 of each vacuum suction pad 3 in such a range, each vacuum suction pad 3 can be satisfactorily vacuum-sucked onto the first side surface 11a of each columnar honeycomb structure 10.

In each columnar honeycomb structure 10, the first side surface 11a is vacuum-sucked by one or more vacuum suction pads 3 in the Y direction. By way of example, FIG. 3(a) shows that the first side surface 11a of the columnar honeycomb structure 10 has been vacuum-sucked by one vacuum suction pad 3, and each of FIGS. 3(a) and 3(c) shows the first side surface 11a of the columnar honeycomb structure 10 has been vacuum-sucked to the two vacuum suction pads 3, in the Y direction.

If the vacuum suction pads 3 are disposed at a pitch interval P in the Y direction, a positional deviation of at most P (each P/2 on left and right) may possibly occur during vacuum suction even if the positions of the vacuum suction pads 3 to be vacuum-sucked on the first side surface 11a of the columnar honeycomb structure 10 has been previously controlled. Once such a positional deviation occurs, the adjacent columnar honeycomb structures 10 will be brought into contact with each other when the first side surfaces 11a of the plurality of columnar honeycomb structures 10 closely aligned in the Y direction are vacuum-sucked by the vacuum suction pads 3.

It is, therefore, preferable that a plurality of rows of the vacuum suction pads 3 are formed in the Z direction, and the vacuum suction pad 3 of an odd-numbered row and the vacuum suction pad 3 of an even-numbered row have a half pitch (P/2) deviation from each other, as shown in FIG. 3(d). FIG. 4 shows such an arrangement state of the vacuum suction pads 3 in the Y-Z direction (in the case where two rows of the vacuum suction pads 3 are provided in the Z direction). Such an arrangement allows control of the position of the first side surface 11a of the columnar honeycomb structure 10 to be vacuum-sucked by the vacuum suction pads 3 arranged in the Y-Z direction, so that the positional deviation of the columnar honeycomb structure 10 can be suppressed during the vacuum suction. It should be noted that if a large number of rows are formed in the Z direction, the positional deviation of the columnar honeycomb structure 10 can be sufficiently suppressed by bringing about the above half pitch (p/2) deviation in some odd-numbered rows and even rows adjacent to each other.

The positional deviation of the columnar honeycomb structure 10 can also be suppressed by reducing the size of the suction portion 30 of each vacuum suction pad 3 to increase the number of the vacuum suction pads 3 arranged in the Y-Z direction. For example, when the cylindrical radius of each columnar honeycomb structure 10 is 50 mm or more, the diameter of the suction portion 30 of each vacuum suction pad 3 is set to 20 mm or less, so that the columnar honeycomb structures 10 can be correctively transferred while suppressing the positional displacement of each columnar honeycomb structure 10.

The arrangement state of the vacuum suction pads 3 is not particularly limited, and it may be adjusted as needed depending on the size of the columnar honeycomb structure 10 and the number of the columnar honeycomb structures 10 to be correctively transferred. It is preferable to have two or more rows in the Z direction, and more preferably three or more rows. Further, the number of the vacuum suction pads 3 forming each row is preferably 20 or more, and more preferably 30 or more.

The total number of the vacuum suction pads 3 provided at the vacuum suction member 4 is also not limited, and it may also be adjusted as needed according to the size of each columnar honeycomb structure 10 and the number of the columnar honeycomb structures 10 to be correctively transferred. The number may be preferably 40 or more, and more preferably 60 or more.

It should be noted that if the number of the vacuum suction pads 3 provided at the vacuum suction member 4 is increased, the number of the vacuum suction pads 3 that do not contribute to vacuum suction of the columnar honeycomb structure 10 will also be increased. Therefore, in such a case, each suction pad 3 is preferably provided with a slot valve or the like to reduce a flow rate of each vacuum suction pad 3 that does not contribute to vacuum suction.

The shape of the support member 5 is not particularly limited as long as it can support the second side surfaces 11b of the plurality of honeycomb structures 10, including, preferably, a rod shape or a plate shape. Such a shape can result in a simple structure of the support member 5.

The material of the support member 5 is not particularly limited, but the support member 5 may be preferably formed from an elastic material as in the vacuum suction pads 3. Examples of the elastic material that can be used include urethane foams and the like, in addition to the above lists. Among them, the material of the support member 5 is preferably the urethane foam. If the material of the support member 5 is the urethane foam, the support member 5 can satisfactorily support the second side surfaces 11b of the columnar honeycomb structures 10.

The vacuum suction member shaft 6 and the support member shaft 7 are provided to support the vacuum suction member 4 and the support member 5, respectively. The vacuum suction member 4 and the support member 5 are fixed to the vacuum suction member shaft 6 and the support member shaft 7 by fixtures such as nuts.

The X direction driver 8 can move the supporting member 5 toward the X direction by expanding and contracting in the X direction. Further, the Z direction driver 9 can move the support member 5 toward the Z direction by being driven in the Z direction along the vacuum suction member shaft 6. It should be noted that the X direction driver 8 and the Z direction driver 9 are not limited to those of the above driving method, and other known driving means may be used.

Each columnar honeycomb structure 10 that can be transferred by the transfer device for the columnar honeycomb structure 10 is not particularly limited, and it may be an intermediate bodies between the producing steps, a final product or the like. More particularly, it may be an intermediate body between the forming step and the firing step, an intermediate body between the firing step and the processing step, a final product after the processing step, and the like.

Each columnar honeycomb structure 10 may have the cylindrical shape, as well as a square columnar shape, an elliptical columnar shape, or the like.

The number of the columnar honeycomb structures 10 to be correctively transferred is preferably 3 or more, and more preferably from 4 to 15, and further preferably from 5 to 10, although it depends on the size of the vacuum suction member 4 or the like. The columnar honeycomb structures 10 having the number as described above can provide a higher effect of improving production efficiency.

When transferring a plurality of columnar honeycomb structures 10 by using the transfer device for the columnar honeycomb structures 10, the first side surfaces 11a of the plurality of columnar honeycomb structures 10 is firstly vacuum-sucked by a plurality of vacuum suction pads 3, whereby the plurality of columnar honeycomb structures 10 are collectively gripped. The arm 2 is then moved to a predetermined position, whereby the plurality of columnar honeycomb structures 10 are collectively transferred. When the plurality of columnar honeycomb structures 10 can be stably gripped only by vacuum suction with the plurality of vacuum suction pads 3, the support member 5 may not be used, but the support member 5 may be always used.

The columnar honeycomb structures 10 have various shapes and weights. In some cases, the columnar honeycomb structures 10 may not be stably gripped only by vacuum suction. For example, when the columnar honeycomb structure 10 has lower height, the number of the vacuum suction pads 3 in contact with the first side surface 11a of the columnar honeycomb structure 10 will be decreased, so that the columnar honeycomb structure 10 may not be horizontally gripped only by vacuum suction. Specifically, when the number of the vacuum suction pads 3 in the Z direction in contact with the first side surface 11a of the columnar honeycomb structure 10 is one or two, it will be difficult to grip horizontally the columnar honeycomb structure 10 only by vacuum suction. FIG. 5(a) shows an enlarged side view of the gripping mechanism 1 showing such a state. Further, even if the columnar honeycomb structure 10 has sufficiently high height, the same trend may be seen because when the columnar honeycomb structure 10 has a larger diameter or weight, a vacuum suction power required for one vacuum suction pad 3 is increased. To increase the force for gripping the columnar honeycomb structure 10 by vacuum suction, it is considered that the size of each vacuum suction pad 3 is reduced to increase the number of the pads 3 or the vacuum suction force is increased, and so one. However, there is a limit to control them.

Therefore, in the above case, the Z direction driver 9 is driven in the Z direction (the downward direction in the figure) and the X direction driver 8 is driven in the X direction (the left direction in the figure) to support the second side surface 11b opposing to the first side surface 11a of each columnar honeycomb structure 10 by the support member 5, so that the support member 5 compensates for a shortage of gripping force caused by the vacuum suction. FIG. 5(b) shows an enlarged side view of the gripping mechanism 1 showing such a state. Thus, the second side surfaces 11b opposing to the first side surfaces 11a of the plurality of columnar honeycomb structures 10 are supported by the support member 5 while vacuum-sucking the first side surfaces 11a of the plurality of columnar honeycomb structures 10, whereby the plurality of columnar honeycomb structures 10 can be stably and correctively gripped and transferred.

The transfer device for the columnar honeycomb structures 10, which has the above characteristics, can transfer the plurality of columnar honeycomb structures 10 arranged on the pallet. In particular, the transfer device for the columnar honeycomb structures 10 is suitable for transferring the plurality of columnar honeycomb structures 10 closely arranged in the X direction and the Y direction on the pallet.

Here, FIG. 6 shows an enlarged side view of the grasping mechanism 1 for explaining the procedure of transferring the plurality of columnar honeycomb structures 10 closely arranged in the X and Y directions on the pallet 20. When transferring the plurality of columnar honeycomb structures 10 arranged in such a state, the first side surfaces 11a of the plurality of columnar honeycomb structures 10 are firstly vacuum-sucked by the plurality of vacuum suction pads 3 (steps (a) and (b)). At this time, when it is possible to stably grip the plurality of columnar honeycomb structures 10 only by vacuum suction, the transferring is performed in this state. Further, by disposing upward the support member 5 in the Z direction, the support member 5 does not become an obstacle.

Therefore, the plurality of honeycomb structures 10 can be sequentially transferred onto a transferring position (for example, onto the pallet 20, a conveyer, or the like) from one side. Thus, for example, if the transferring position is an upper side of the pallet 20, the plurality of columnar honeycomb structures 10 can be closely arranged in the X direction and the Y direction even on the transferring position, so that the transferring space can be reduced (for example, the number of the pallets 20 can be decreased).

On the other hand, when the plurality of columnar honeycomb structures 10 cannot be stably gripped only by vacuum suction, the plurality of columnar honeycomb structures 10 are pulled or lifted up while vacuum-sucking the first side surfaces 11a of the plurality of columnar honeycomb structures 10, to move the plurality of columnar honeycomb structures 10 toward the X direction (the left direction in the figure) and broaden a space between the plurality of columnar honeycomb structures 10 adjacent in the X direction (a step (c)). Subsequently, the Z direction driver 9 is driven in the Z direction (the downward direction in the figure) and the X direction driver 8 is driven in the X direction (the left direction in the figure) to support and grip the second side surfaces 11b opposing to the first side surfaces of the plurality of columnar honeycomb structures 10 by the support member 5, and the transferring is then carried out (steps (d) and (e)). The transferring carried out with such a procedure allows corrective transfer of the plurality of columnar honeycomb structures 10 closely arranged in the X direction and the Y direction on the pallet 20.

It should be noted that if it is possible to lift up the plurality of columnar honeycomb structures 10 while vacuum-sucking the first side surfaces 11a, the step (c) may be omitted and the steps (d) and (e) may be performed together with the lifting up of the plurality of columnar honeycomb structures. The transferring carried out with such a procedure allows improvement of an efficiency of transferring work.

As described above, according to the above method and device for transferring the columnar honeycomb structures 10, the plurality of the columnar honeycomb structures 10 can be correctively transferred, thereby improving the production efficiency.

DESCRIPTION OF REFERENCE NUMERALS 1 gripping mechanism
2 arm
3 vacuum suction pad
4 vacuum suction member
5 support member
6 vacuum suction member shaft
7 support member shaft
8 X direction driver
9 Z direction driver
10 honeycomb structure
11a first side surface
11b second side surface
20 pallet
30 suction portion

What is claimed is:

1. A method for transferring a plurality of columnar honeycomb structures, the method comprising: subjecting first side surfaces of the plurality of columnar honeycomb structures to vacuum suction along a surface parallel to a plane in a Y-Z direction; and correctively transferring the plurality of the columnar honeycomb structures, optionally while supporting second side surfaces opposing to the first side surfaces of the plurality of columnar honeycomb structures by a supporting member,
    wherein the first side surfaces of the plurality of columnar honeycomb structures are oriented in a vertical direction, and
    wherein the plane in a Y-Z direction is oriented in a vertical direction that is perpendicular to a plane in an X-Y direction oriented in a horizontal direction.

2. The method for transferring the plurality of columnar honeycomb structures according to claim 1, wherein each of the plurality of columnar honeycomb structure is in the form of cylinder.

3. A device for transferring a plurality of columnar honeycomb structures, comprising:
    a vacuum suction member comprising a plurality of vacuum suction pads, the vacuum suction member being configured to vacuum-suck first side surfaces of the plurality of columnar honeycomb structures along a surface parallel to a plane in a Y-Z direction by the plurality of vacuum suction pads; and
    a support member that is drivable in two X and Z directions perpendicular to a Y direction in which the vacuum-sucked columnar honeycomb structures are aligned, the support member supporting second side surfaces opposing to the first side surfaces of the plurality of columnar honeycomb structures
    wherein the first side surfaces of the plurality of columnar honeycomb structures are oriented in a vertical direction, and
    wherein the plane in a Y-Z direction is oriented in a vertical direction that is perpendicular to a plane in an X-Y direction oriented in a horizontal direction.

4. The device for transferring the plurality of columnar honeycomb structures according to claim 3, wherein the plurality of vacuum suction pads are provided in the Y direction and the Z direction that is a vertical direction.

5. The device for transferring the plurality of columnar honeycomb structures according to claim 3, wherein a plurality of rows of the plurality of vacuum suction pads are formed in the Z direction that is the vertical direction, and wherein the vacuum suction pad of an odd-numbered row and the vacuum suction pad of an even-numbered row have a half pitch deviation from each other.

6. The device for transferring the plurality of columnar honeycomb structures according to claim 3, wherein each of the plurality of vacuum suction pads comprises a suction portion having a diameter of from greater than 0 mm to 20 mm or less.

7. The device for transferring the plurality of columnar honeycomb structures according to claim 3, wherein the vacuum suction pad is made of a silicone rubber or an ethylene propylene diene rubber.

8. The device for transferring the plurality of columnar honeycomb structures according to claim 3, wherein the support member has a rod shape or a plate shape.

9. The device for transferring the plurality of columnar honeycomb structures according to claim 3, wherein each of the plurality of columnar honeycomb structure is in the form of cylinder.

* * * * *